(12) United States Patent
Sekii

(10) Patent No.: US 12,198,369 B2
(45) Date of Patent: Jan. 14, 2025

(54) THREE-DIMENSIONAL POSE ESTIMATION METHOD, PROGRAM, RECORDING MEDIUM AND THREE-DIMENSIONAL POSE ESTIMATION DEVICE

(71) Applicant: Konica Minolta, Inc., Tokyo (JP)

(72) Inventor: Taiki Sekii, Takatsuki (JP)

(73) Assignee: Konica Minolta, Inc., Tokyo (JP)

( * ) Notice: Subject to any disclaimer, the term of this patent is extended or adjusted under 35 U.S.C. 154(b) by 574 days.

(21) Appl. No.: 17/610,924

(22) PCT Filed: Apr. 15, 2020

(86) PCT No.: PCT/JP2020/016571
§ 371 (c)(1),
(2) Date: Nov. 12, 2021

(87) PCT Pub. No.: WO2020/241100
PCT Pub. Date: Dec. 3, 2020

(65) Prior Publication Data
US 2022/0254052 A1     Aug. 11, 2022

(30) Foreign Application Priority Data
May 30, 2019    (JP) ................................ 2019-101023

(51) Int. Cl.
*G06T 7/70*      (2017.01)
*G06T 7/50*      (2017.01)

(52) U.S. Cl.
CPC .................. *G06T 7/70* (2017.01); *G06T 7/50* (2017.01); *G06T 2207/20084* (2013.01); *G06T 2207/30196* (2013.01)

(58) Field of Classification Search
CPC ... G06T 7/70; G06T 7/50; G06T 2207/20084; G06T 2207/301096
See application file for complete search history.

(56) References Cited

U.S. PATENT DOCUMENTS

2014/0334670 A1* 11/2014 Guigues ............... G06V 10/426
382/103
2019/0266734 A1* 8/2019 Yamanaka ................ G06T 7/50

OTHER PUBLICATIONS

Dushyant Mehta, et al., "Single-Shot Multi-Person 3D Pose Estimation From Monocular RGB", International Conference on 3D Vision (3DV 2018), published on Aug. 28, 2018 (16 pages).

(Continued)

*Primary Examiner* — Myron Wyche
(74) *Attorney, Agent, or Firm* — Osha Bergman Watanabe & Burton LLP

(57) ABSTRACT

A method for estimating a three-dimensional pose from control points of an image of the object, includes: selecting, for each pair consisting of first and second control points that define a skeleton of the object, relative positions of the first control point with respect to the second control point on the image, estimating, for each of the selected relative positions, a relative depth of the first control point with respect to the second control point over the entire image based on an assumption that the second control point exists at each position on the image; detecting two-dimensional positions of the control points on the image for the object using the image; obtaining, based on the relative depth estimated for each of the selected relative positions and the two-dimensional positions of the control points, relative three-dimensional positions of the control points; and estimating the three-dimensional pose for the object.

16 Claims, 7 Drawing Sheets

○: CONTROL POINTS
(TWO-DIMENSIONAL COORDINATES)

(56) References Cited

OTHER PUBLICATIONS

International Search Report issued in corresponding International Application No. PCT/JP2020/016571, mailed on Jul. 21, 2020 (5 pages).
Written Opinion issued in corresponding International Application No. PCT/JP2020/016571, mailed on Jul. 21, 2020 (3 pages).

* cited by examiner

RELATIVE DEPTH MAP WHEN POSITION ON IMAGE OF OTHER CONTROL POINT WITH RESPECT TO ONE CONTROL POINT IS ASSUMED AS $(x_1, y_1)$

RELATIVE DEPTH MAP WHEN POSITION ON IMAGE OF OTHER CONTROL POINT WITH RESPECT TO ONE CONTROL POINT IS ASSUMED AS $(x_p, y_p)$

FIG. 8
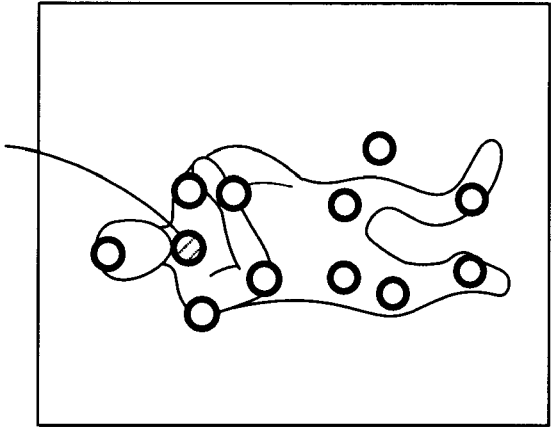
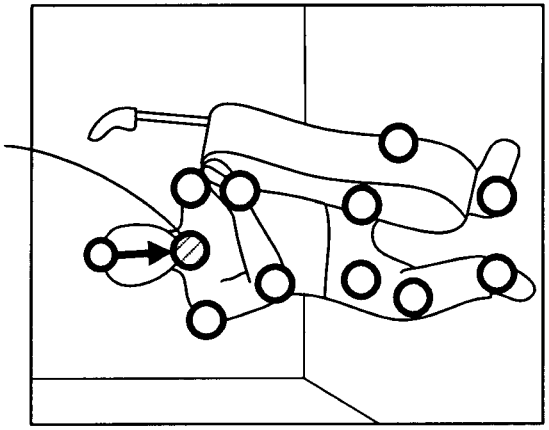

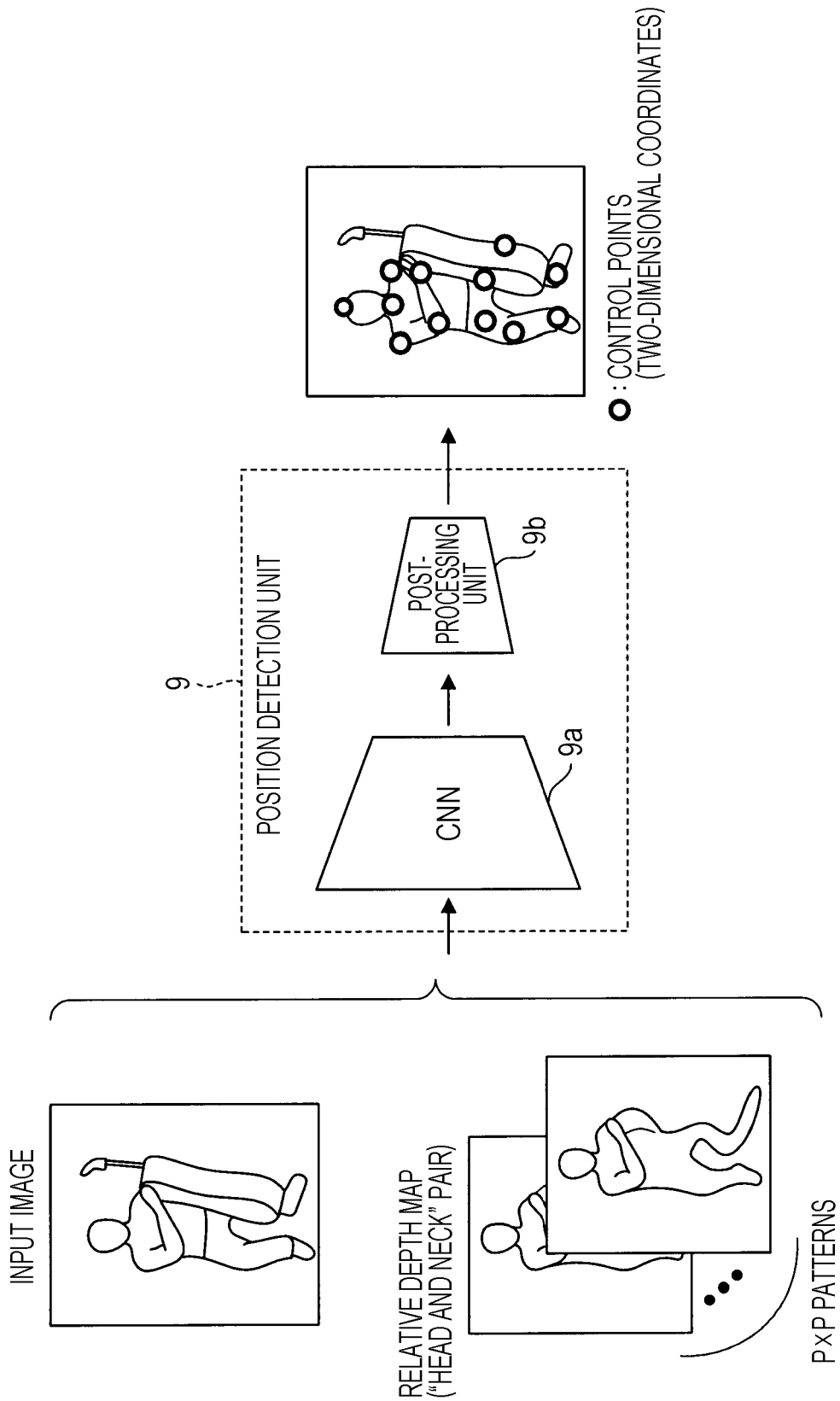

THREE-DIMENSIONAL POSE ESTIMATION METHOD, PROGRAM, RECORDING MEDIUM AND THREE-DIMENSIONAL POSE ESTIMATION DEVICE

BACKGROUND

Technical Field

The present invention relates to a three-dimensional pose estimation method for estimating a three-dimensional pose of an object for each object from an image in which at least one object is captured, instructions for causing a computer to execute the three-dimensional pose estimation method, a recording medium in which the instructions are recorded, and a three-dimensional pose estimation device.

Description of Related Art

A technology for detecting a three-dimensional pose (three-dimensional absolute or relative coordinates of each joint point) of a person from a video captured by a camera is used as a basic technology of many applications such as a monitoring camera system. In recent years, a technique has been proposed for estimating a three-dimensional pose of a person from candidate positions on an image of each joint of the person detected using a convolutional neural network (CNN) and a depth separately estimated by the CNN (see, for example, Non Patent Literature 1).

CITATION LIST

Non Patent Literature

Non Patent Literature 1: Dushyant Mehta, et al., "Single-Shot Multi-Person 3D Pose Estimation From Monocular RGB", International Conference on 3D Vision (3DV 2018), Aug. 28, 2018

However, in the technique of Non Patent Literature 1, it is unclear at which position on the image there is a joint for which the depth estimated by the CNN is a relative depth (a joint position serving as a reference on the image is unknown in estimating the relative depth). For this reason, estimation of the depth becomes ambiguous, and estimation accuracy of the depth decreases. Consequently, estimation accuracy of the three-dimensional pose of the object decreases.

SUMMARY

One or more embodiments of the present invention provide a three-dimensional pose estimation method capable of eliminating ambiguity of depth estimation and improving depth estimation accuracy in estimating a depth of a control point such as a joint position that defines a skeleton of an object on an image, and thereby improving estimation accuracy of three-dimensional pose of the object, instructions for causing a computer to execute the three-dimensional pose estimation method, a recording medium that records the instructions, and a three-dimensional pose estimation device.

A three-dimensional pose estimation method according to one or more embodiments of the present invention is a three-dimensional pose estimation method for estimating, from control points of an image in which at least one object is captured, a three-dimensional pose of the object for each of the objects, the three-dimensional pose estimation method including a depth map estimation step of assuming or selecting, for each of a pair of control points (or each pair consisting a first control point and a second control point) defining a skeleton of the object that is predetermined, a plurality of relative positions, with respect to one control point of the pair on the image, of the other control point and estimating a relative depth of the other control point with respect to the one control point over the entire image assuming or on an assumption that the one control point exists at each position on the image for each of the plurality of assumed or selected relative positions, a position detection step of detecting two-dimensional positions of a plurality of the control points on the image for each of the objects by using the image, and a pose estimation step of obtaining relative three-dimensional positions of the plurality of the control points on the basis of the relative depth estimated for each of the plurality of assumed relative positions and the two-dimensional positions of the plurality of the control points, and thereby estimating the three-dimensional pose for each of the objects based on the relative three-dimensional positions.

Instructions according to one or more embodiments of the present invention are instructions for causing a computer to execute the three-dimensional pose estimation method described above.

A recording medium according to one or more embodiments of the present invention is a computer readable recording medium on which the instructions described above are recorded.

A three-dimensional pose estimation device according to one or more embodiments of the present invention is a three-dimensional pose estimation device that estimates, from control points of an image in which at least one object is captured, a three-dimensional pose of the object for each of the objects, the three-dimensional pose estimation device including a depth map estimation unit (i.e., depth map estimator) that assumes or selects, for each of a pair of control points (or each pair consisting a first control point and a second control point) defining a skeleton of the object that is predetermined, a plurality of relative positions, with respect to one control point of the pair on the image, of the other control point and estimates a relative depth of the other control point with respect to the one control point over the entire image assuming or on an assumption that the one control point exists at each position on the image for each of the plurality of assumed or selected relative positions, a position detection unit (i.e., position detector) that detects two-dimensional positions of a plurality of the control points on the image for each of the objects by using the image, and a pose estimation unit (i.e., hardware processor) that obtains relative three-dimensional positions of the plurality of the control points on the basis of the relative depth estimated for each of the plurality of assumed relative positions and the two-dimensional positions of the plurality of the control points, and thereby estimates the three-dimensional pose for each of the objects based on the relative three-dimensional positions.

By a depth map estimation step (or a depth map estimation unit), a plurality of relative positions, with respect to one control point constituting a pair on an image, of the other control point is assumed, and for each of the plurality of assumed relative positions, a relative depth of the other control point with respect to the one control point is estimated over the entire image. Thus, it is clear that the estimated relative depth is a depth with reference to which control point. Therefore, the estimation of the depth does not become ambiguous.

Further, since two-dimensional positions of a plurality of the control points on the image are detected by the position detection step (or the position detection unit), in a pose estimation step (or a pose estimation unit), it is possible to obtain relative three-dimensional positions of the plurality of the control points on the basis of the relative depth estimated for each of the plurality of relative positions and the two-dimensional positions of the plurality of control points, and thereby it is possible to estimate a three-dimensional pose of an object. For example, since relative positions between the control points constituting the pair can be obtained from the above-described two-dimensional positions of the plurality of control points, a relative depth corresponding to a relative position between the control points constituting the pair is extracted from the relative depth estimated for each of the plurality of relative positions, and such extraction of the relative depth is performed for each of the plurality of pairs, thereby making it possible to obtain the relative three-dimensional positions of the plurality of control points and estimate the three-dimensional pose of the object.

As described above, upon estimating relative depths of a plurality of control points defining a skeleton of the object, the estimation of the depth does not become ambiguous, and thus estimation accuracy of depth can be improved. Therefore, it is possible to improve the estimation accuracy when estimating the three-dimensional pose of the object using the estimated relative depths.

BRIEF DESCRIPTION OF DRAWINGS

FIG. 8 is an explanatory diagram schematically illustrating processing of obtaining, with reference to one contiguous control point, a three-dimensional position of the other control point.

FIG. 9 is an explanatory diagram schematically illustrating another example of processing of detecting a two-dimensional position of each control point by the position detection unit described above.

DETAILED DESCRIPTION OF EMBODIMENTS

Embodiments of the present invention will be described below with reference to the drawings. Note that the present invention is not limited to the following contents.

[Configuration of Three-Dimensional Pose Estimation Device]

Figure 1:
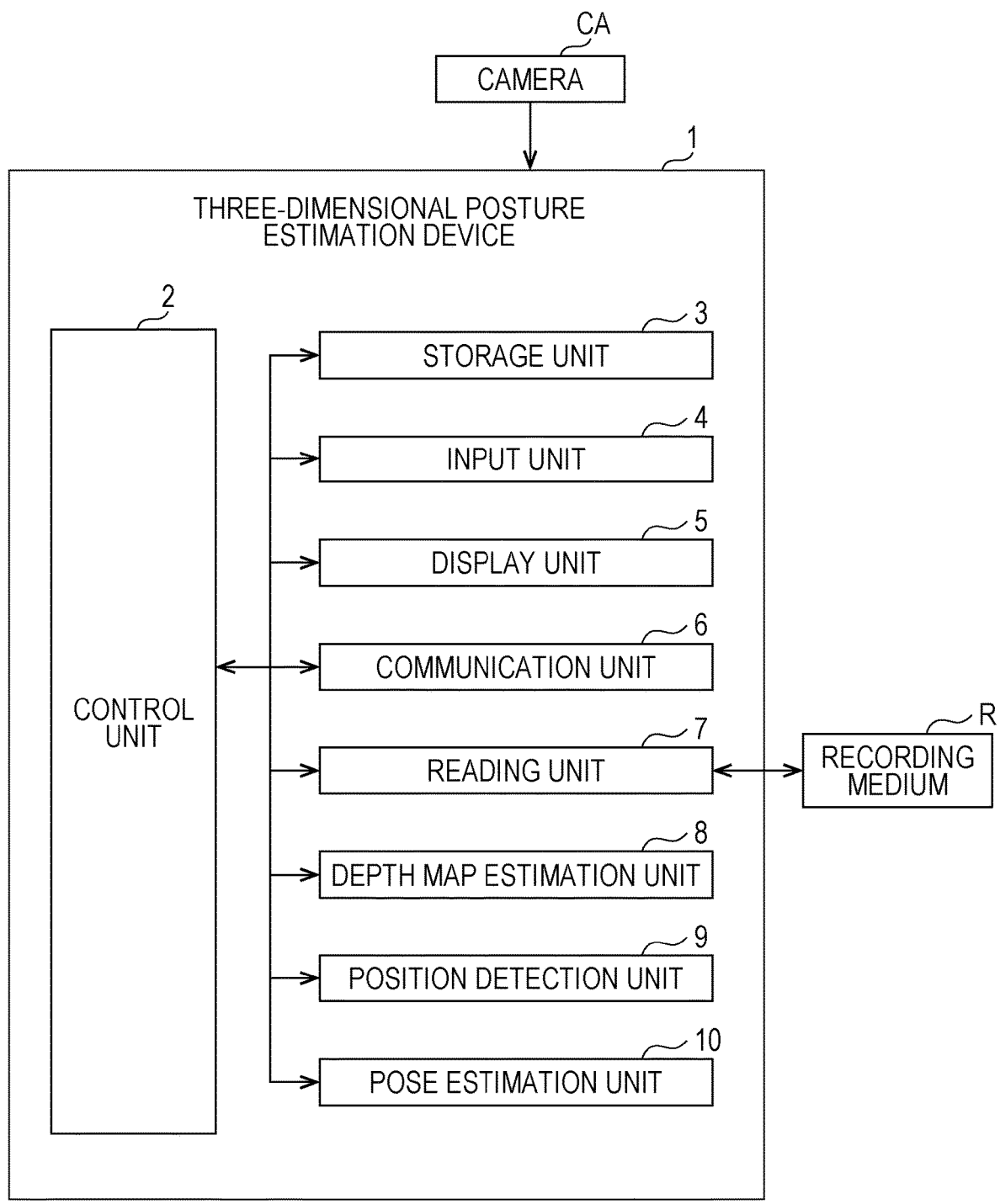
FIG. 1 is a block diagram illustrating a schematic configuration of a three-dimensional pose estimation device of one or more embodiments of the present invention.

FIG. 1 is a block diagram illustrating a schematic configuration of a three-dimensional pose estimation device 1 of one or more embodiments. The three-dimensional pose estimation device 1 is constituted by, for example, a terminal device such as a personal computer, and is connected to at least one camera CA installed in a store via a communication line (regardless of wired or wireless). When data of an image (a moving image or a still image) acquired by capturing with the camera CA is input to the three-dimensional pose estimation device 1, the three-dimensional pose estimation device 1 executes processing by a three-dimensional pose estimation method to be described later, thereby estimating a three-dimensional pose of an object captured in the image. Note that in one or more embodiments, the "object" mainly refers to a person, but may be other than a person. For example, an animal, a vehicle such as a car or a train, or a structure such as a building can also be included in the "object". Hereinafter, the three-dimensional pose estimation device 1 will be described in detail.

The three-dimensional pose estimation device 1 includes a control unit 2, a storage unit 3, an input unit 4, a display unit 5, a communication unit 6, a reading unit 7, a depth map estimation unit 8, a position detection unit 9, and a pose estimation unit 10.

The control unit 2 is constituted by, for example, a central processing unit (CPU), and operates according to an operation instruction stored in the storage unit 3 to control operation of each unit of the three-dimensional pose estimation device 1.

The storage unit 3 is a memory that stores the operation instruction described above, image data acquired by the camera CA, and the like. The storage unit 3 is constituted by, for example, a hard disk, but may be constituted by appropriately selecting from recording media such as a random access memory (RAM), a read only memory (ROM), an optical disk, a magneto-optical disk, and a non-volatile memory.

The input unit 4 includes, for example, a keyboard, a mouse, a touch pad, a touch panel, and the like, and receives various instruction inputs by the user. The display unit 5 is a device that displays various types of information such as the image acquired by the camera CA and a three-dimensional pose of the object estimated by the pose estimation unit 10, and is constituted by, for example, a liquid crystal display device. The communication unit 6 is an interface for communicating with the outside (including the camera CA), and includes an input/output terminal and the like. Note that, for example, in a case where the camera CA and the three-dimensional pose estimation device 1 wirelessly communicate (for example, transmit and receive image data), the communication unit 6 may include an antenna, a transmission and reception circuit, a modulation circuit, a demodulation circuit, and the like.

The reading unit 7 is a device that reads information (for example, an operation instruction of the control unit 2) recorded on the recording medium R, and is constituted by, for example, a reading device such as a disk drive. Note that in a case where the recording medium R is a portable nonvolatile memory, a connection port into which a connection portion of the nonvolatile memory described above will be inserted is also included in the reading unit 7.

The depth map estimation unit 8 assumes, for each of a pair of control points defining a skeleton of a predetermined object, a plurality of relative positions, with respect to one control point of the pair on the image, of the other control point, and estimates a relative depth of the other control point with respect to the one control point over the entire image assuming that the one control point exists at each position on the image for each of the plurality of assumed relative positions, and outputs the estimated relative depth as a relative depth map.

Here, when the object is, for example, a person, the control points described above include a position of a joint (joint point) of the person and a center position of a skull. Note that the positions of the eyes, nose, and ears of the person on the image can also be control points since they also define the size and shape of the skull. Further, here, the pair of control points refers to a pair of contiguous control points. Note that the "contiguous control points" means that two control points are in a continuous positional relationship in defining the skeleton of the object. Therefore, for example, on the image, respective positions of the head and the neck of the person are two contiguous control points and constitute a pair of contiguous control points. Further, for example, on the image, respective positions of the left knee and the left heel of the person are also two contiguous control points and constitute a pair of contiguous control points. Therefore, for example, when assuming three relative positions of the left shoulder and the left elbow of the person constituting the pair of contiguous control points on the image, the depth map estimation unit 8 outputs the relative depth map in which the relative depth of the left elbow with respect to the left shoulder is estimated for each of the assumed three relative positions.

Such a depth map estimation unit 8 is constituted by, for example, a conventional neural network (CNN) capable of performing machine learning. That is, the CNN constituting the depth map estimation unit 8 is learned in advance so as to detect (estimate), for each of the plurality of assumed relative positions, the relative depth of the other control point with respect to the one control point constituting a pair of contiguous control points on the image described above, when the image is input.

Note that the definitions for pairs of control points, such as pairs of contiguous control points (wrist and elbow pair, elbow and shoulder pair, and the like) and the relative positions assumed for each pair, are set in advance and the CNN is learned under that setting. Therefore, the CNN outputs the relative depth map of the entire image under such setting.

Using the input image, the position detection unit 9 detects two-dimensional positions of a plurality of control points on the image for each object. Like the depth map estimation unit 8, such a position detection unit 9 is constituted by the CNN capable of performing machine learning. Note that, for detection of the two-dimensional position described above by the position detection unit 9, for example, a known technique such as a technique described in Zhe Cao, et al., "OpenPose: Realtime Multi-Person 2D Pose Estimation using Part AffinityFields", Computer Vision and Pattern Recognition (cs.CV), Submitted on 18 Dec. 2018, or the like can be used.

The CNN constituting the depth map estimation unit 8 and the position detection unit 9 described above can be achieved by a graphics processing unit (GPU) which is an arithmetic device specialized in real-time image processing.

The pose estimation unit 10 estimates the three-dimensional pose for each object by obtaining the relative three-dimensional position of the plurality of control points on the basis of the relative depth estimated for each of the plurality of relative positions by the depth map estimation unit 8 and two-dimensional positions of the plurality of control points detected by the position detection unit 9. Such a pose estimation unit 10 is constituted by, for example, a CPU, but may be configured by the GPU described above.

Here, a description of the CNN constituting the depth map estimation unit 8 and the position detection unit 9 will be supplemented.

Figure 2:
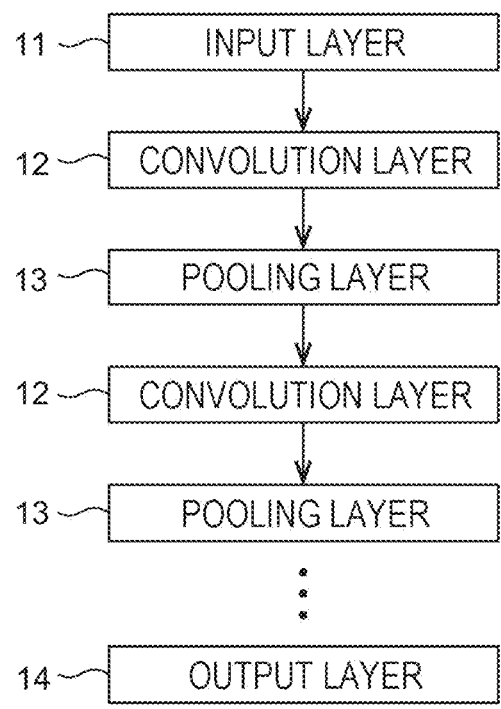
FIG. 2 is an explanatory diagram schematically illustrating a configuration of a CNN constituting a depth map estimation unit and a position detection unit of the three-dimensional pose estimation device described above.

FIG. 2 is an explanatory diagram schematically illustrating a configuration of the CNN. The CNN includes an input layer 11, a convolution layer 12, a pooling layer 13, and an output layer 14. Although it is only required to have at least one set of the convolution layer 12 and the pooling layer 13, there may be a plurality of sets thereof.

Each of the above-described layers constituting the CNN has a plurality of nodes (or units), and at least a part of the plurality of nodes is connected by an edge between the respective layers. A neural network is an information processing system that imitates a human neural network, and the nodes described above represent models of engineering neurons corresponding to human nerve cells. Each layer has a function called an activation function (response function), and the edge has a weight. Therefore, the value output from the node of each layer is calculated from the value of the node of the previous layer, the weight of the edge, and the activation function of the layer. Note that the weight of the edge can be changed by learning.

Data (pixel value) of each pixel constituting one image is input to each node of the input layer 11. The convolution layer 12 performs filter processing on a value output from a predetermined node of the previous layer to obtain a feature map. The pooling layer 13 further reduces the feature map output from the convolution layer 12 to obtain a new feature map. The output layer 14 is the final layer of the CNN, and outputs predetermined information (for example, the relative depth of the other control point with respect to one control point constituting the pair, information on the two-dimensional position of each control point on the image, and the like) from the value of a node of the previous layer, the weight of the edge, and the activation function of the output layer 14. Note that the output layer 14 may be constituted by a convolution layer that performs filter processing, or may be constituted by a fully connected layer that connects outputs from all nodes of the previous layer, performs a predetermined operation, and outputs each parameter.

As a learning algorithm of the CNN, for example, it is possible to use an error back propagation method (back propagation) in which image data with a correct answer is used, and a weight of each layer (edge) is sequentially changed from the output layer 14 side toward the input layer 11 side using a steepest descent method so that a square error between an output value from the output layer 14 obtained when the image data described above is input and a value indicating the correct answer is minimized. By causing the CNN to learn in advance in this manner, the above-described predetermined information can be output from the CNN when an image in which at least one object is captured is input to the CNN. That is, it is possible to detect (estimate) the relative depth of the other control point with respect to one control point constituting the pair and the two-dimensional position of each control point on the image.

[Three-Dimensional Position Estimation Method]

Figure 3:
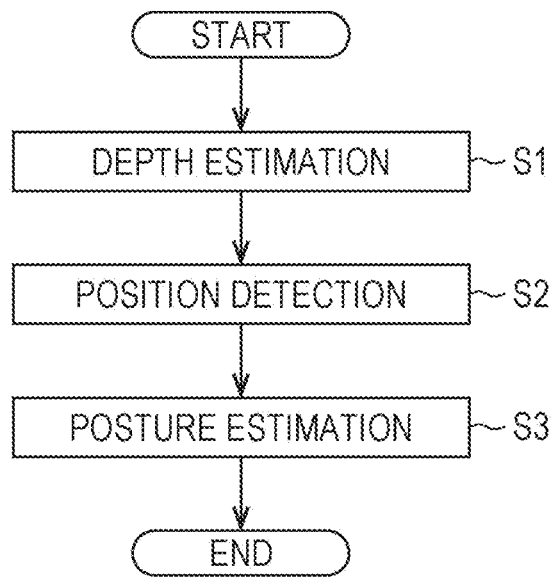
FIG. 3 is a flowchart illustrating a flow of processing by a three-dimensional position estimation method executed by the three-dimensional pose estimation device described above.

Next, a three-dimensional position estimation method of one or more embodiments will be described. FIG. 3 is a flowchart illustrating a flow of processing by the three-dimensional position estimation method executed by the three-dimensional pose estimation device 1 of FIG. 1. The three-dimensional position estimation method of one or more embodiments includes a depth map estimation step (S1), a position detection step (S2), and a pose estimation step (S3). This will be described in more detail below.

(S1: Depth Map Estimation Step)

In S1, when an image is input, the depth map estimation unit 8 assumes, for each of a plurality of pairs of contiguous control points, a plurality of relative positions, with respect to one control point of the pair, of the other control point by neuro computation in CNN, and estimates a relative depth of the other control point with respect to the one control point over the entire image assuming that the one control point exists at each position on the image for each of the plurality of assumed relative positions, and outputs a relative depth map indicating an estimation result of the relative depth. Note that when the number of control points is N and the number of pairs of contiguous control points is L, L=(N−1). However, since L is plural (L≥2), N≥3.

Figure 4:
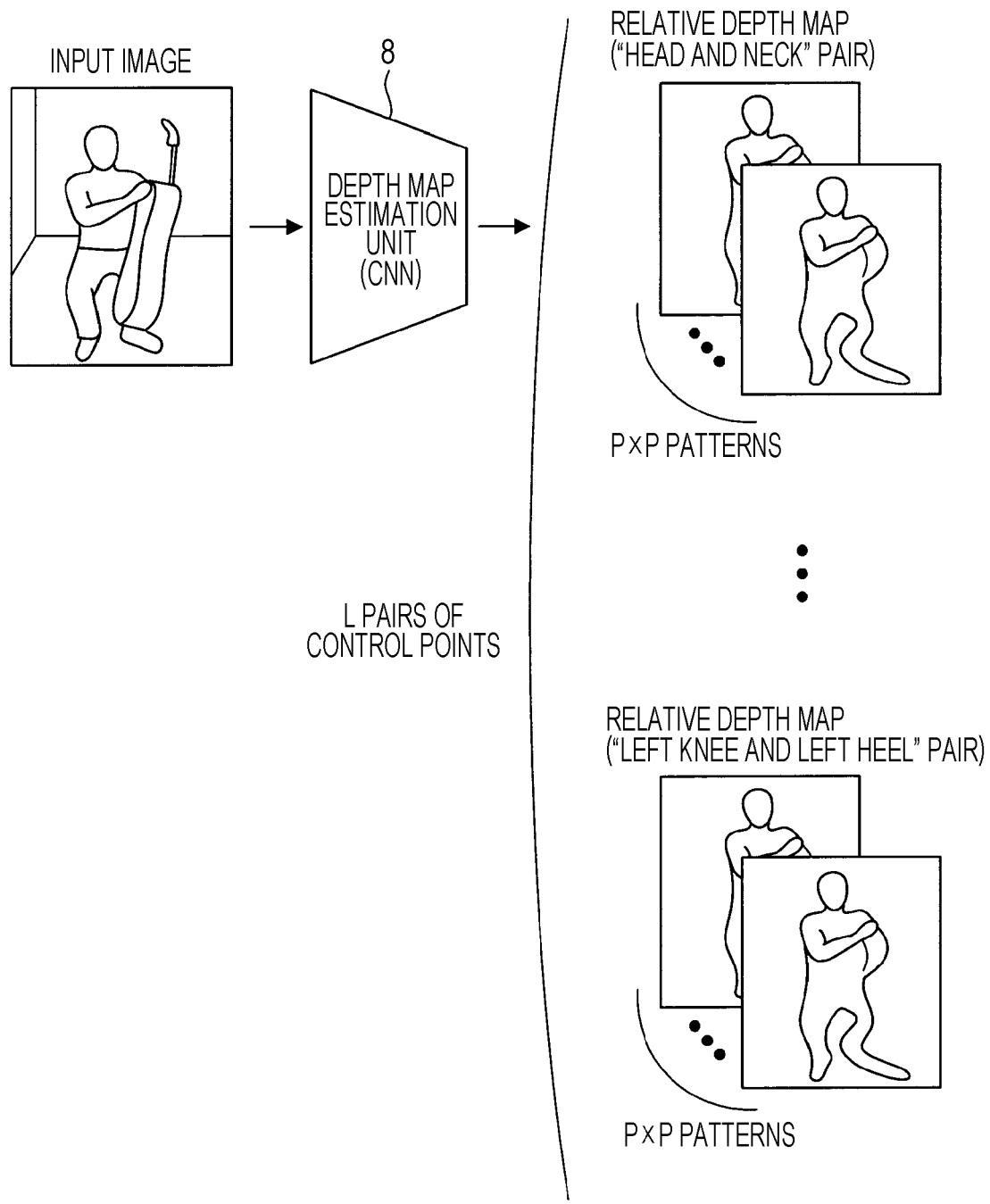
FIG. 4 is an explanatory diagram schematically illustrating a relative depth map output from the depth map estimation unit described above.

For example, FIG. 4 schematically illustrates a feature map (relative depth map) obtained by inputting an image in which a person is captured to the CNN constituting the depth map estimation unit 8. FIG. 4 illustrates a case where a relative depth map of a P×P pattern is obtained for each of L pairs from a "head and neck" pair to a "left knee and left heel" pair as pairs of contiguous control points. Note that P is an integer of 2 or more.

Figure 5:
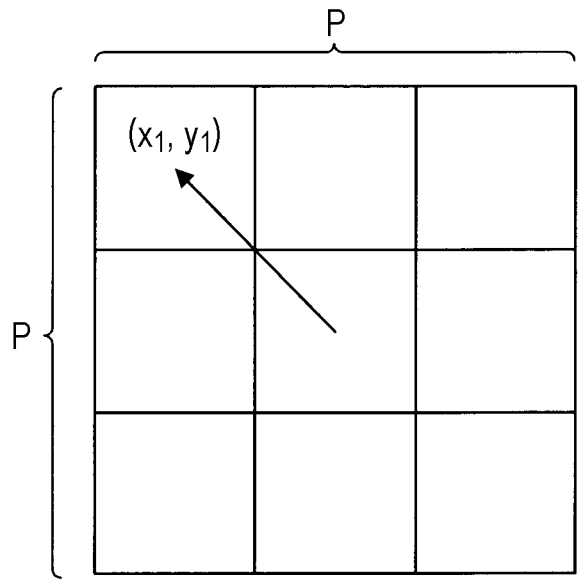
FIG. 5 is an explanatory diagram schematically illustrating an example of the relative depth map described above.
Figure 6:
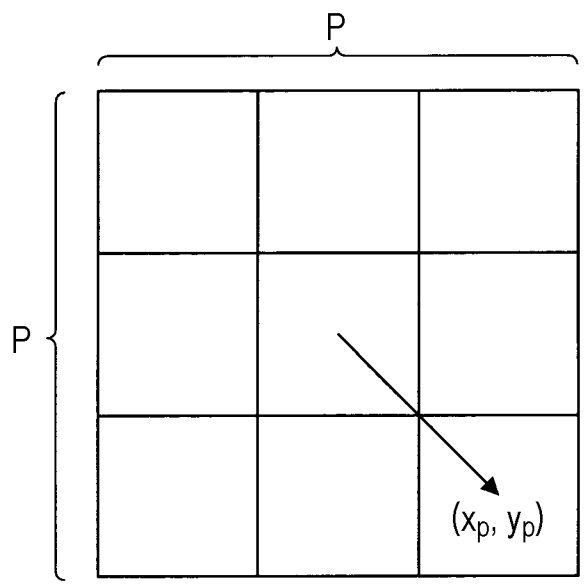
FIG. 6 is an explanatory diagram schematically illustrating another example of the relative depth map described above.

Here, details of the relative depth map described above will be described. FIG. 5 schematically illustrates the relative depth map when the relative position of the "neck" with respect to the "head" is assumed to be $(x_1, y_1)$ on an image divided into a grid of height×width=P×P in the "head and neck" pair. Further, FIG. 6 schematically illustrates the relative depth map when the relative position of the "neck" with respect to the "head" is assumed to be $(x_p, y_p)$ on the image divided into the grid of height×width=P×P in the "head and neck" pair. Note that it is assumed that the arrows in these drawings indicate the relative depth (in the unit of cm, for example).

When P=3, there are nine (P×P=3×3=9) relative positions of other grids with respect to any grid (including relative positions between the same grids). Therefore, in this case, the depth map estimation unit 8 can assume nine ways as the relative position of the other control point (for example, "neck") with respect to one control point (for example, "head"). Then, the depth map estimation unit 8 estimates the relative depth, with respect to one control point (for example, "head"), of the other control point (for example, "neck") for the assumed relative position by the CNN learned in advance, and can obtain nine kinds of relative depth maps (P×P patterns) in total. Note that, for each pair other than the "head/neck" pair, the relative depth maps of the P×P patterns can be obtained similarly to as described above.

As described above, in S1, by the neuro computation in the CNN constituting the depth map estimation unit 8, a plurality of patterns (P×P patterns) of relative depth maps indicating estimation results of the relative depths is generated corresponding to the plurality of assumed relative positions for each pair of contiguous control points.

Note that the relative depth in a case where it is assumed that one control point serving as a reference among the control points constituting the pair exists at any position X on the image and the other control point further exists at a position (X+dX) of the relative position dX on the image from the position X is m(X, dX). In this case, the CNN constituting the depth map estimation unit 8 outputs one relative depth map M(dX) for each relative position dX (any one of $(x_1, y_1)$ to $(x_p, y_p)$). Therefore, when the image size is vertical W grid×horizontal H grid, the relative depth map M(dX) is a set of relative depths of {m((0, 0), dX), . . . , m((W−1, H−1), dX)}, that is, a relative depth map of W×H. In the CNN, since the value of the relative depth is comprehensively estimated over X (the entire image) and the range of dX (P×P of $(x_1, y_1)$ to $(x_p, y_p)$) each of which is set assuming that each control point exists at the positions of X and (X+dX), the relative depth map output from the depth map estimation unit 8 (CNN) in S1 becomes a tensor of the third floor of W×H×(P×P).

(S2; Position Detection Step)

Figure 7:
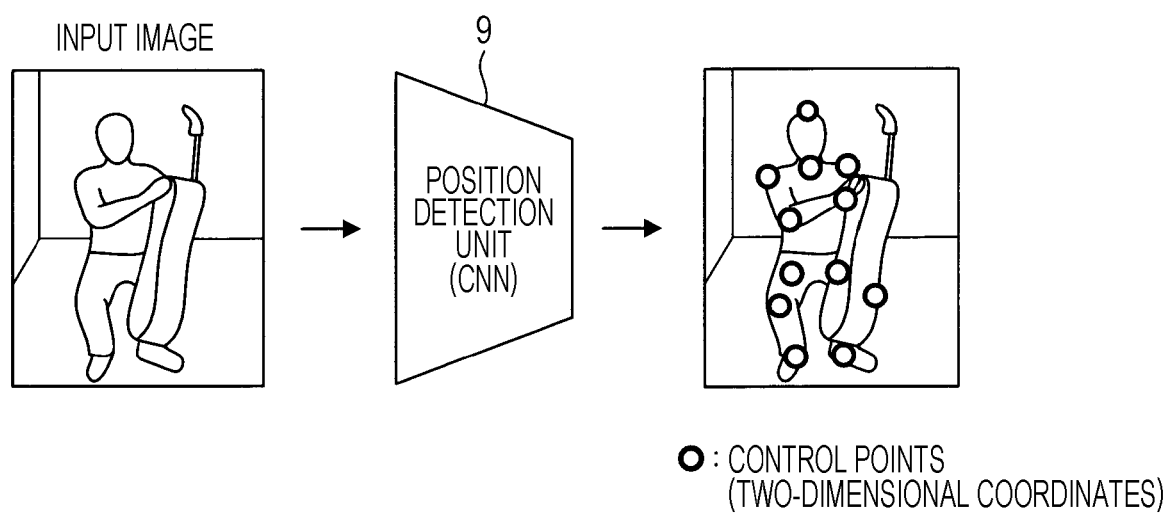
FIG. 7 is an explanatory diagram schematically illustrating an example of processing of detecting a two-dimensional position of each control point by the position detection unit described above.

In S2, the position detection unit 9 detects (estimates), from the input image, two-dimensional positions (two-dimensional coordinates) of the plurality of control points on the image described above by neuro computation in the CNN based on the algorithm of "OpenPose" described above. For example, as illustrated in FIG. 7, the two-dimensional position of each control point such as the head, the neck, and the left shoulder of the person captured in the image is detected by the position detection unit 9.

(S3; Pose Estimation Step)

In S3, the pose estimation unit 10 estimates the three-dimensional pose of the person in the image by obtaining the relative three-dimensional position of the plurality of control points on the basis of the relative depth estimated in S1, that is, the relative depth estimated for each of the plurality of relative positions assumed for each pair of control points, and the two-dimensional position of the plurality of control points detected in S2.

For example, FIG. 8 schematically illustrates processing of obtaining the three-dimensional position of the neck with reference to the head (origin position) in a "head and neck" pair that is a pair of contiguous control points. When the two-dimensional position of each control point is detected in S2, the relative position (two-dimensional coordinates) of the neck with reference to the head is specified. Here, two-dimensional coordinates indicating the relative position of the neck with respect to the head are $(x_h, y_h)$. In S1, the pose estimation unit 10 detects a relative position coincident with $(x_h, y_h)$ from nine types of relative positions assumed for the "head and neck" pair, and detects (extracts) a relative depth corresponding to the relative position described above with reference to a plurality of relative depth maps obtained in S1. When the extracted relative depth, that is, the relative depth of the neck with respect to the head is, for example, $z_h$, the pose estimation unit 10 outputs the coordinates of the three-dimensional position of the neck with respect to the head as $(x_h, y_h, z_h)$ on the basis of the two-dimensional coordinates $(x_h, y_h)$ indicating the relative position of the neck with respect to the head and the relative depth $(z_h)$ of the neck with respect to the head.

Next, the pose estimation unit 10 performs, with reference to the neck, processing similar to as described above also for a control point (for example, the left shoulder) paired with the neck. Thus, coordinates indicating the three-dimensional position of the left shoulder with respect to the neck are output from the pose estimation unit 10. Thereafter, the pose estimation unit 10 can acquire the coordinates of the relative three-dimensional position of the other control point with respect to one control point for all the pairs by sequentially shifting the pairs of the contiguous control points and performing processing similar to as described above, and it is thereby possible to estimate the three-dimensional pose of the person in the image.

Effects

As described above, in S1, a plurality of (for example, nine) relative positions, with respect to one control point (for example, the head) forming a pair on the image, of the other control point (for example, the neck) is assumed, and a relative depth of the other control point with respect to the one control point is estimated for each of the plurality of assumed relative positions (see FIGS. 5 and 6). Therefore, it is clear that the estimated relative depth is a depth with reference to which control point (in the above example, it is clear that the relative depth of the neck of the person on the image is the depth with reference to the head). Thus, the estimation of the depth does not become ambiguous as in the conventional art, and the estimation accuracy of the depth can be improved.

Further, in S2, since two-dimensional positions of the plurality of control points on the image are detected, the relative positions of the two control points forming the pair on the image can be obtained. Accordingly, in S3, it is possible to extract the relative depth (for example, $(z_h)$) corresponding to the relative position (for example, $(x_h, y_h)$) of the two control points constituting the pair with reference to the relative depth estimated for each of the plurality of relative positions. Then, by performing such extraction of the relative depth for each of the plurality of pairs, it is possible to obtain the relative three-dimensional position of the plurality of control points and estimate the three-dimensional pose of the object. In one or more embodiments, since the estimation accuracy of the depth can be improved as described above, the estimation accuracy when estimating the three-dimensional pose of the object as described above using the estimated relative depth can also be improved.

Further, in S2, the two-dimensional positions of the plurality of control points are detected by neuro computation in the CNN. In this case, detection of the two-dimensional positions of the plurality of control points can be performed quickly and with high accuracy, and further improvement in detection accuracy of the two-dimensional positions by machine learning of the CNN can be expected.

Further, in S1, estimation of the relative depth of the other control point with respect to one control point is executed by neuro computation in the CNN. In this case, estimation of the relative depth can be performed quickly and with high accuracy, and further improvement in estimation accuracy of the relative depth by machine learning of the CNN can be expected.

Further, in S1, the neuro computation in the CNN generates, for each pair of control points, a plurality of patterns (for example, nine patterns for one pair) of relative depth maps indicating estimation results of the relative depth corresponding to each of a plurality of relative positions assumed for two control points constituting the pair. Then, in S3, (1) the relative position of the other control point with respect to one control point is obtained for each of the plurality of pairs on the basis of the two-dimensional positions of the plurality of control points detected in S2, (2) the relative depth corresponding to the relative position obtained in above (1) is extracted by referring to the plurality of patterns of relative depth maps generated in S1, and (3) the relative three-dimensional positions of the plurality of control points are obtained on the basis of the relative depth extracted in above (2) and the two-dimensional positions of the plurality of control points obtained in S2. Since the relative depth corresponding to the relative position of the control point can be easily extracted by referring to the relative depth maps of the plurality of patterns obtained by the neuro computation, the relative three-dimensional positions of the plurality of control points can be easily obtained on the basis of the extracted relative depth and the two-dimensional position described above.

Further, in one or more embodiments, the plurality of control points includes joint points of a person as an object. In this case, the three-dimensional pose of the person can be estimated by obtaining the relative three-dimensional positions of the plurality of joint points.

Note that, in the above, an example has been described in which there is one person captured in the image and the three-dimensional pose of the one person is estimated, but even in a case where there is a plurality of persons captured in the image, it is possible to estimate the three-dimensional pose of each person (for each object) by performing the above-described estimation of the depth and detection of the two-dimensional position of the control point for each person (for each object).

Modification Example

FIG. 9 is an explanatory diagram schematically illustrating another example of the position detection step in S2 described above. In the position detection step S2, the position detection unit 9 may detect the two-dimensional positions of the plurality of control points on the image for each of the objects by using the relative depth (the relative depth map generated in S1) estimated in the depth estimation step S1 in addition to the input image from the camera CA. Such a position detection unit 9 can include a calculation unit (or calculator) 9a and a post-processing unit 9b. The calculation unit 9a is constituted by, for example, the CNN, and the post-processing unit 9b includes, for example, a CPU.

For example, the calculation unit 9a is caused to learn in advance to output candidates of two-dimensional positions of a plurality of control points of the object on the image and likelihood (probability, score) thereof when an image and a relative depth map are input. At the time of detecting the two-dimensional position, the post-processing unit 9b selects a candidate having the likelihood that is highest from among the candidates of the two-dimensional positions output from the calculation unit 9a, and outputs information (for example, coordinates) of the two-dimensional position of the selected candidate.

As described above, by using the information of the relative depth (relative depth map) in addition to the input image from the camera CA, the amount of information used for detection of the two-dimensional position increases, so that the detection accuracy of the two-dimensional position of each control point is further improved, and the estimation accuracy of the three-dimensional pose based on the detected two-dimensional position can be further improved.

In particular, by configuring the position detection unit 9 with the calculation unit 9a and the post-processing unit 9b described above, the detection accuracy of the two-dimensional position of each control point can be reliably improved, and the estimation accuracy of the three-dimensional pose can be reliably improved.

[Instructions and Recording Medium]

The three-dimensional pose estimation device 1 described in one or more embodiments can be configured by, for example, a computer (PC) in which predetermined instructions (application software) are installed. By reading and executing the instructions by a computer (for example, the control unit 2 as a CPU), each unit of the three-dimensional pose estimation device 1 can be operated to execute each processing (each step) described above. Such instructions are acquired by being downloaded from the outside via, for example, a network and stored in the storage unit 3. Further, the instructions may be in a form that is recorded on a computer readable recording medium R such as a compact disk-read only memory (CD-ROM), for example, and the computer reads the instructions described above from the recording medium R and stores the instructions in the storage unit 3.

OTHERS

The three-dimensional pose estimation device 1 of the embodiments described above is not necessarily connected to the camera CA, and is only required to be configured so that image data can be acquired from the outside. For example, the three-dimensional pose estimation device 1 may be configured to acquire the image data described above by receiving an electronic mail to which a file of image data is attached from another terminal device, or acquire the image data described above necessary for estimation of the three-dimensional pose by reading the image data recorded on the recording medium R by the reading unit 7.

The three-dimensional pose estimation method, the instructions, the recording medium, and the three-dimensional pose estimation device of the embodiments described above may be expressed as follows.

Aspect 1. A three-dimensional pose estimation method for estimating, from an image in which at least one object is captured, a three-dimensional pose of the object for each of the objects, the three-dimensional pose estimation method including:

a depth map estimation step of assuming, for each of a pair of control points defining a skeleton of the object that is predetermined, a plurality of relative positions, with respect to one control point of the pair on the image, of the other control point and estimating a relative depth of the other control point with respect to the one control point over the entire image assuming that the one control point exists at each position on the image for each of the plurality of assumed relative positions;

a position detection step of detecting two-dimensional positions of a plurality of the control points on the image for each of the objects by using the image; and a pose estimation step of obtaining relative three-dimensional positions of the plurality of the control points on the basis of the relative depth estimated for each of the plurality of assumed relative positions and the two-dimensional positions of the plurality of the control points, and thereby estimating the three-dimensional pose for each of the objects.

Aspect 2. The three-dimensional pose estimation method according to aspect 1, in which in the position detection step, the detection of the two-dimensional positions of the plurality of control points are executed by neuro computation.

Aspect 3. The three-dimensional pose estimation method according to aspect 1 or 2, in which in the depth map estimation step, the estimation of the relative depth is executed by neuro computation.

Aspect 4. The three-dimensional pose estimation method according to aspect 1, in which in the position detection step, the two-dimensional positions are detected for each of the objects by using the relative depth estimated in the depth map estimation step in addition to the image.

Aspect 5. The three-dimensional pose estimation method according to aspect 4, in which in the position detection step, candidates and likelihoods of the two-dimensional positions are obtained by neuro computation on the basis of the image and the relative depth, a candidate having the likelihood that is highest is selected from among the candidates of the two-dimensional positions, and coordinates of a two-dimensional position of the selected candidate are output.

Aspect 6. The three-dimensional pose estimation method according to any one of aspect 1 to 5, in which
in the depth map estimation step, a plurality of patterns of a relative depth map indicating an estimation result of the relative depth is generated corresponding to each of the plurality of relative positions by the neuro computation, and in the pose estimation step, a relative position, with respect to one control point, of the other control point is obtained for each of the pair on the basis of the two-dimensional positions of the plurality of control points, a relative depth corresponding to the relative position is extracted by referring to the relative depth map of the plurality of patterns, and a relative three-dimensional position of the plurality of control points is obtained on the basis of the extracted relative depth and the two-dimensional positions of the plurality of control points.

Aspect 7. The three-dimensional pose estimation method according to any one of aspect 1 to 6, in which the plurality of control points includes joint points of a person as the object.

Aspect 8. Instructions for causing a computer to execute the three-dimensional pose estimation method according to any one of aspect 1 to 7.

Aspect 9. A computer readable recording medium on which the instructions according to aspect 8 are recorded.

Aspect 10. A three-dimensional pose estimation device that estimates, from an image in which at least one object is captured, a three-dimensional pose of the object for each of the objects, the three-dimensional pose estimation device including:

a depth map estimation unit that assumes, for each of a pair of control points defining a skeleton of the object that is predetermined, a plurality of relative positions, with respect to one control point of the pair on the image, of the other control point and estimates a relative depth of the other control point with respect to the one control point over the entire image assuming that the one control point exists at each position on the image for each of the plurality of assumed relative positions;

a position detection unit that detects two-dimensional positions of a plurality of the control points on the image for each of the objects by using the image; and a pose estimation unit that obtains relative three-dimensional positions of the plurality of the control points on the basis of the relative depth estimated for each of the plurality of assumed relative positions and the two-dimensional positions of the plurality of the control points, and thereby estimates the three-dimensional pose for each of the objects.

Aspect 11. The three-dimensional pose estimation device according to aspect 10, in which the position detection unit executes the detection of the two-dimensional positions of the plurality of control points by neuro computation.

Aspect 12. The three-dimensional pose estimation device according to aspect 10 or 11, in which the depth map estimation unit executes the estimation of the relative depth by neuro computation.

Aspect 13. The three-dimensional pose estimation device according to aspect 10, in which the position detection unit detects the two-dimensional positions for each of the objects by using the relative depth estimated by the depth map estimation unit in addition to the image.

Aspect 14. The three-dimensional pose estimation device according to aspect 13, in which the position detection unit includes:

a calculation unit that obtains candidates and likelihoods of the two-dimensional positions by neuro computation on the basis of the image and the relative depth; and a post-processing unit that selects a candidate having the likelihood that is highest from among the candidates of the two-dimensional positions, and outputs coordinates of a two-dimensional position of the selected candidate.

Aspect 15. The three-dimensional pose estimation device according to any one of aspect 10 to 14, in which the depth map estimation unit generates a plurality of patterns of a relative depth map indicating an estimation result of the relative depth corresponding to each of the plurality of relative positions by the neuro computation, and the pose estimation unit obtains a relative position, with respect to one control point, of the other control point for each of the pair on the basis of the two-dimensional positions of the plurality of control points, extracts a relative depth corresponding to the relative position by referring to the relative depth map of the plurality of patterns, and obtains a relative three-dimensional position of the plurality of control points on the basis of the extracted relative depth and the two-dimensional positions of the plurality of control points.

Aspect 16. The three-dimensional pose estimation device according to any one of aspect 10 to 15, in which the plurality of control points includes joint points of a person as the object.

Although the embodiments of the present invention have been described above, the scope of the present invention is not limited thereto, and can be expanded or modified without departing from the gist of the invention.

INDUSTRIAL APPLICABILITY

The present invention is applicable to, for example, an application for estimating a three-dimensional pose of an object captured in an image.

REFERENCE SIGNS LIST

1 Three-dimensional pose estimation device
8 Depth map estimation unit
9 Position detection unit
10 Pose estimation unit
R Recording medium

The invention claimed is:

1. A three-dimensional pose estimation method for estimating a three-dimensional pose of an object from control points of an image of the object, the three-dimensional pose estimation method comprising:

selecting, for each pair consisting of a first control point and a second control point that define a skeleton of the object, relative positions of the first control point with respect to the second control point on the image, wherein the selecting includes:

generating by neuro computation a plurality of patterns of a relative depth map indicating an estimation result of the relative depth, wherein the patterns correspond to the relative positions;

estimating, for each of the selected relative positions, a relative depth of the first control point with respect to the second control point over the entire image based on an assumption that the second control point exists at each position on the image;

detecting two-dimensional positions of the control points on the image for the object using the image;

obtaining, based on the relative depth estimated for each of the selected relative positions and the two-dimensional positions of the control points, relative three-dimensional positions of the control points, wherein the obtaining includes:

obtaining a relative position of the first control point with respect to the second control point for the pair based on the two-dimensional positions of the control points, extracting a relative depth corresponding to the relative position by referring to the patterns of the relative depth map, and obtaining a relative three-dimensional position of the control points based on the extracted relative depth and the two-dimensional positions of the control points; and estimating the three-dimensional pose for the object based on the relative three-dimensional positions.

2. The three-dimensional pose estimation method according to claim 1, wherein the detecting of the two-dimensional positions is executed by neuro computation.

3. The three-dimensional pose estimation method according to claim 1, wherein the estimating of the relative depth is executed by neuro computation.

4. The three-dimensional pose estimation method according to claim 1, wherein in the detecting, the two-dimensional positions are detected for the object using the relative depth estimated in the estimating in addition to the image.

5. The three-dimensional pose estimation method according to claim 4, wherein the detecting includes, obtaining candidates and likelihoods of the two-dimensional positions by neuro computation based on the image and the relative depth, selecting a candidate having a highest likelihood from among the candidates of the two-dimensional positions, and outputting coordinates of a two-dimensional position of the selected candidate.

6. The three-dimensional pose estimation method according to claim 1, wherein the control points include joint points of a person as the object.

7. A non-transitory computer readable recording medium storing instructions for causing a computer to execute the three-dimensional pose estimation method according to claim 1.

8. A three-dimensional pose estimation device that estimates a three-dimensional pose of an object from control points of an image of the object, the three-dimensional pose estimation device comprising:

a depth map estimator that:

generates by neuro computation a plurality of patterns of a relative depth map indicating an estimation result of the relative depth, wherein the patterns correspond to the relative positions, selects, for each pair consisting of a first control point and a second control point that define a skeleton of the object, relative positions of the first control point with respect to the second control point on the image, estimates, for each of the selected relative positions, a relative depth of the first control point with respect to the second control point over the entire image based on an assumption that the second control point exists at each position on the image, and a position detector that detects two-dimensional positions of the control points on the image for the object using the image, and a hardware processor that:

obtains, based on the relative depth estimated for each of the selected relative positions and the two-dimensional positions of the control points, relative three-dimensional positions of the control points, obtains a relative position of the first control point with respect to the second control point for the pair based on the two-dimensional positions of the control points, extracts a relative depth corresponding to the relative position by referring to the patterns of the relative depth map, obtains a relative three-dimensional position of the control points based on the extracted relative depth and the two-dimensional positions of the control points, and estimates the three-dimensional pose for the object based on the relative three-dimensional positions.

9. The three-dimensional pose estimation device according to claim 8, wherein the position detector detects the two-dimensional positions by neuro computation.

10. The three-dimensional pose estimation device according to claim 8, wherein the depth map estimator estimates the relative depth by neuro computation.

11. The three-dimensional pose estimation device according to claim 8, wherein the position detector detects the two-dimensional positions for the object using the relative depth estimated by the depth map estimator in addition to the image.

12. The three-dimensional pose estimation device according to claim 11, wherein the position detector includes:

a calculator that obtains candidates and likelihoods of the two-dimensional positions by neuro computation based on the image and the relative depth, and a CPU that selects a candidate having a highest likelihood from among the candidates of the two-dimensional positions, and outputs coordinates of a two-dimensional position of the selected candidate.

13. The three-dimensional pose estimation device according to claim 8, wherein the control points include joint points of a person as the object.

14. The three-dimensional pose estimation method according to claim 2, wherein the estimating of the relative depth is executed by neuro computation.

15. The three-dimensional pose estimation method according to claim 2, wherein the control points include joint points of a person as the object.

16. A non-transitory computer readable recording medium storing instructions for causing a computer to execute the three-dimensional pose estimation method according to claim 2.

* * * * *